United States Patent
Manabe et al.

[11] Patent Number: 5,974,264
[45] Date of Patent: Oct. 26, 1999

[54] CAMERA AND SECURING STRUCTURE FOR FRONT COVER THEREOF

[75] Inventors: Mitsuo Manabe; Kazuhiro Tsuyuki, both of Saitama, Japan

[73] Assignee: Fuji Photo Optical Co., Ltd., Saitama, Japan

[21] Appl. No.: 08/978,645

[22] Filed: Nov. 26, 1997

[30] Foreign Application Priority Data

Nov. 27, 1996 [JP] Japan .................................. 8-316529
Nov. 27, 1996 [JP] Japan .................................. 8-316534

[51] Int. Cl.$^6$ .................................................. G03B 17/24
[52] U.S. Cl. ................................................ 396/6; 396/535
[58] Field of Search .......................... 396/6, 535

[56] References Cited

U.S. PATENT DOCUMENTS 5,708,897  1/1998  Manabe et al. ..................... 396/535
5,815,758  9/1998  Terada ................................. 396/535

FOREIGN PATENT DOCUMENTS 743810  2/1995  Japan .

Primary Examiner—David M. Gray
Attorney, Agent, or Firm—Leydig, Voit & Mayer, Ltd.

[57] ABSTRACT

The lens barrel cover of a camera is made separately from its front cover, whereby the center positions of the lens barrel and opening of the lens barrel cover can easily be aligned with each other. Also, since the insertion opening of the front cover is disposed as being shielded with the lens barrel cover, the insertion opening is not exposed to the exterior of the camera, whereby the appearance of the camera will not be spoiled even if the insertion opening and lens barrel positionally deviate from each other. Further, since the front cover is pressed toward the main body section as the lens barrel cover is being attached, no gap is formed between the front cover and the main body section.

13 Claims, 3 Drawing Sheets

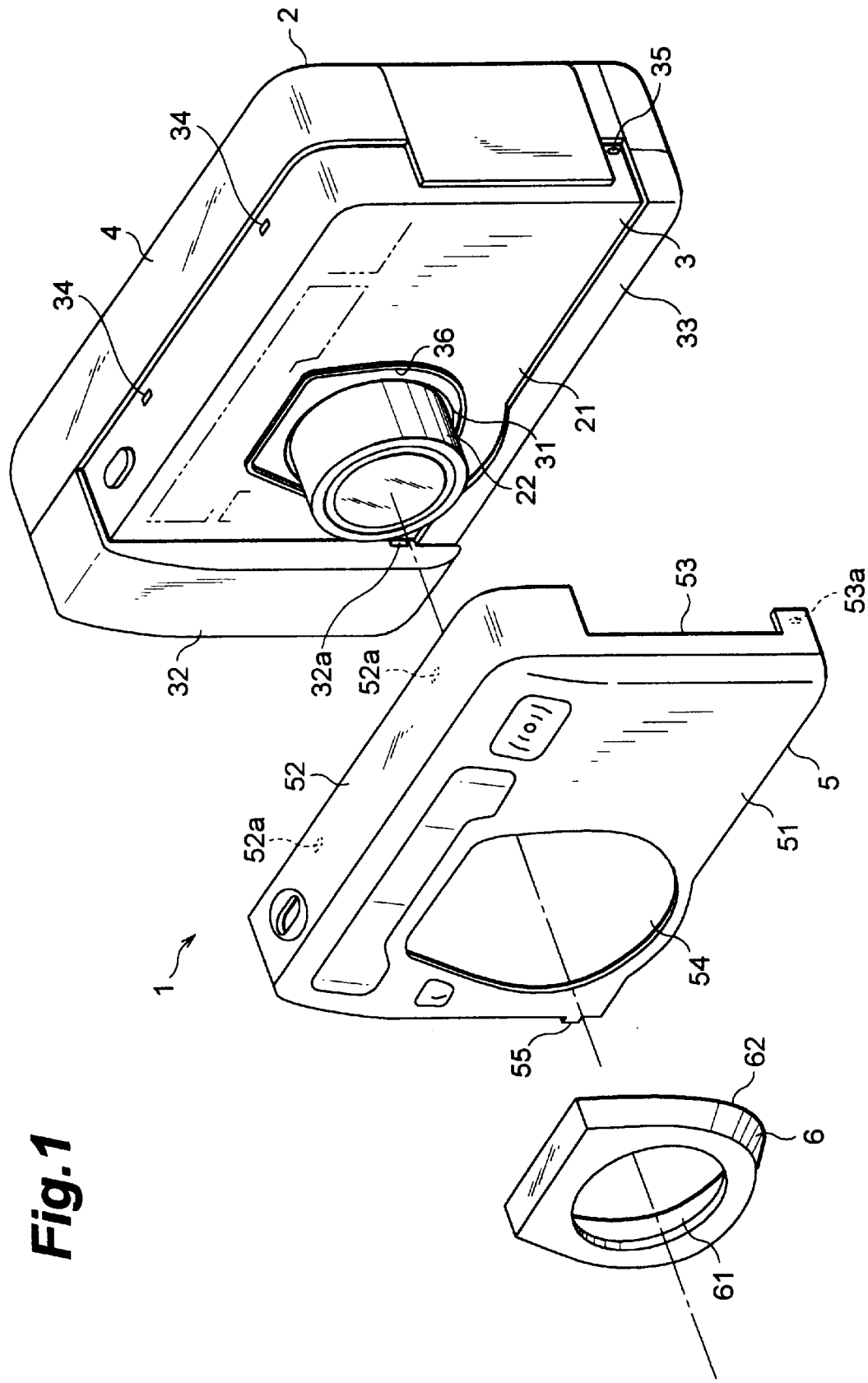

CAMERA AND SECURING STRUCTURE FOR FRONT COVER THEREOF

BACKGROUND OF THE INVENTION

1. Field of the Invention

The present invention relates to a camera having a main body whose front face is armored with a front cover, and a structure for securing the front cover.

2. Related Background Art

There has been known a compact camera which enables photographing with an angle of view adjusted by extending or retracting its lens barrel without exchanging lenses. Under development in such a compact camera is one in which the main body section thereof is armored with a cover made of a metal such as titanium or aluminum, so as to impart a feeling of quality thereto. Meanwhile, in a compact camera equipped with a zoom lens having a large zoom ratio, e.g., with a focal length ranging from 40 to 105 mm; since its taking lens is large, the lens barrel section for the taking lens projects from the front face of the camera. In order for the periphery of the lens barrel section in such a compact camera to be armored with the metal cover as well, as shown in FIG. 3, a cover A may be cylindrically projected by press machining (drawing) in conformity to the projecting state of a lens barrel B, thereby forming a protrusion C having an opening F, at its tip face, for projecting the lens barrel B therethrough. In this case, since the opening F and the tip portion of the lens barrel B are exposed to the exterior of the camera, it is important for the cover A to be accurately positioned with respect to the main body section having the lens barrel B. In order to position the cover A, a frame D of the main body section may be provided with a projection E, while a recess for receiving the projection E is formed on the rear face of the cover A. In this case, when the projection E is inserted into the recess, the center positions of the opening F of the cover A and the lens barrel B can be aligned with each other.

Nevertheless, the camera having the above-mentioned projecting lens barrel B may have the following problems. First, it is difficult to align the center positions of the opening F and lens barrel B with each other. Namely, the position of the cover A with respect to the frame D of the main body section is defined by the position of the projection E on the frame D and the position of the recess on the rear face of the cover A. Consequently, unless both of the projection E and the recess are formed at accurate positions with accurate dimensions, the opening F cannot be located as designed. In this case, the lens barrel B fails to be centered with respect to the opening F, whereby the appearance of the camera might be spoiled. Also, a boring step of forming the recess on the rear face of the metal cover A increases the cost of making the camera. Second, the cover A might float from the frame D (i.e., a gap might be formed between the frame D and the cover A). Namely, though an adhesive, a double-sided adhesive tape, or the like may be interposed between the frame D and the cover A in order to firmly attach the cover A to the frame D, the cover A might be floated from the frame D depending on the form of the protrusion C.

SUMMARY OF THE INVENTION

In order to overcome the foregoing problems, it is an object of the present invention to provide a camera in which the center positions of its lens barrel and opening for projecting the lens barrel can securely be aligned with each other so that a front cover is secured to the main body section without fault, and a structure for securing the front cover.

The present invention provides, a structure for securing a front cover of a camera having a lens barrel projecting from a main body section, the structure comprising:

a front cover for covering a front face of the main body section while exposing one side portion and a lower portion of the front face of the main body section, the front cover having an opening for inserting the lens barrel therethrough and an engaging element projecting toward the side portion or lower portion of the front face of the main body section; and lens barrel cover, secured to the main body section, for covering an outer periphery of a projecting portion of the lens barrel;

wherein the lens barrel cover is pressed against an edge portion of the opening of the front cover, and the engaging element engages with the side portion or lower portion of the front face of the main body section.

Also, the present invention provides, a structure for securing a front cover of a camera having a lens barrel projecting from a main body section, the structure comprises:

a front cover for covering a front face of the main body section while exposing one side portion and a lower portion of the front face of the main body section, the front cover having an opening for inserting the lens barrel therethrough and an engaging element projecting toward the side portion or lower portion of the front face of the main body section; and a lens barrel cover, secured to the main body section, for covering an outer periphery of a projecting portion of the lens barrel;

wherein the lens barrel cover pressed against a peripheral portion of an edge portion of the opening of the front cover, and the engaging element engages with the side portion or lower portion of the front face of the main body section.

Further, the present invention provides a camera comprising:

a main body section;

a lens barrel projecting from the main body section;

a front cover for covering a front face of the main body section while exposing one side portion and a lower portion of the front face of the main body section, the front cover having an opening for inserting the lens barrel therethrough and an engaging element projecting toward the side portion or lower portion of the front face of the main body section; and a lens barrel cover, secured to the main body section, for covering an outer periphery of a projecting portion of the lens barrel;

wherein the lens barrel cover is secured to the main body section by abutting an edge portion of the opening of the front cover, while the engaging element engages with the side portion or lower portion of the front face of the main body section.

Further, the present invention provides a camera comprising:

a main body section;

a lens barrel projecting from the main body section;

a front cover for covering a front face of the main body section while exposing one side portion and a lower portion of the front face of the main body section, the front cover having an opening for inserting the lens barrel therethrough and an engaging element projecting toward the side portion or lower portion of the front face of the main body section; and a lens barrel cover, secured to the main body section, for covering an outer periphery of a projecting portion of the lens barrel;

wherein the lens barrel cover is secured to the main body section by abutting a peripheral portion of an edge portion of the opening of the front cover, while the engaging element engages with the side portion or lower portion of the front face of the main body section.

In accordance with the present invention, the lens barrel cover is made separately from the front cover, thus allowing the center positions of the lens barrel and the opening of the lens barrel cover to be easily aligned with each other. Also, since the lens barrel cover is disposed in a state where it covers the insertion opening of the front cover, the insertion opening of the front cover is not exposed to the exterior of the camera. Accordingly, even if the insertion opening and lens barrel positionally deviate from each other, the appearance of the camera will not be spoiled. Further, as the lens barrel cover is being attached, the front cover is pressed toward the main body section, whereby no gap is formed between the front cover and the main body section.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is an exploded perspective view showing a camera in accordance with an embodiment of the present invention;

DETAILED DESCRIPTION OF THE PREFERRED EMBODIMENTS

Figure 2A:
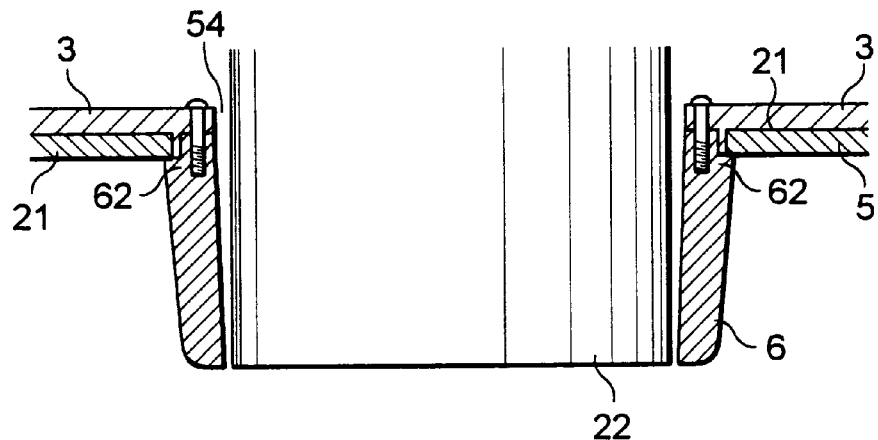
FIG. 2A is a view for explaining a structure for attaching a lens barrel cover in a camera.

In the following, various embodiments of the present invention will be explained with reference to the accompanying drawings. Among the drawings, constituents identical to each other will be referred to with characters identical to each other, without their overlapping explanations being repeated.

Embodiment 1

FIG. 1 is an exploded perspective view showing a camera in accordance with Embodiment 1 of the present invention. In FIG. 1, a camera 1 is configured such that a front cover 5 and a lens barrel cover 6 are attached to a front face 21 of a main body section 2. The main body section 2 is provided with a frame (not shown) for attaching various parts thereto. The front face portion of the main body frame is armored with a front case 3, whereas the back face portion is armored with a back case 4. Preferably used as the front case 3 and the back case 4, in order to reduce the cost and weight thereof, for example, are those made of a resin. The main body section 2 is provided with a lens barrel 22 projecting from the front face 21. The lens barrel 22, projecting forward from the front case 3 through an opening 31, incorporates therein a taking lens system and is adapted to extend and retract with respect to the main body section in response to switching operations between telephoto and wide-angle photographing modes.

As shown in FIG. 1, the front case 3 is configured such that its surface is recessed except for one side portion 32 and a lower portion 33 in order to receive the front cover 5. The side wall inside the side portion 32 is provided with a hole 32a. The hole 32a is adapted to engage with the front cover 5 and is formed in the vicinity of the lower portion 33. Also, the upper face of the front case 3 is provided with holes 34 and 34, whereas the side face of the front case 3 in the vicinity of the lower portion 33 is formed with a hole 35. A rib 36 projects forward from the front case 3 around the opening 31 for projecting the lens barrel 22. The rib 36, which is adapted to mate with a rear end portion 62 of the lens barrel cover 6, is formed in conformity to the shape of the rear end portion 62 of the lens barrel cover 6.

In FIG. 1, the front cover 5, which is a decorative member partially covering the front face 21 of the main body section 2, is made of a metal such as titanium or aluminum. Also, the front cover 5 comprises a front face portion 51 which covers the front face 21 except for the one side portion 32 and the lower portion 33. For example, as shown in FIG. 1, the upper end of the front face portion 51 is bent substantially at right angles toward the main body section 2 so as to form an upper face portion 52, and a side end of the front face portion 51 is bent substantially at right angles toward the main body section 2 so as to form a side face portion 53. Preferably, as the front cover 5, the one having a thickness greater than the projecting length of the rib 36 is used. In this case, it is possible for the front cover 5 to be pressed toward the main body section 2 while the rear end portion of the lens barrel cover 6 mates with the rib 36. Further, it is preferred that the side portion 32 and lower portion 33 of the main body section 2 be provided with distinctive decorations such as flashy colors and gloss. In this manner, the front cover 5 is accentuated in the exterior of the camera 1, thus rendering a feeling of compactness to the camera.

Also, the front cover 5 is formed with an insertion opening 54 for inserting the lens barrel 22 therethrough. The insertion opening 54 penetrates through the front cover 5 and is formed in conformity to the outer shape of the rib 36 projecting from the front face 21. Specifically, it is formed such that the inner surface of the insertion opening 54 abuts to the outer wall surface of the rib 36 when the front cover 5 is attached to the main body section 2.

As shown in FIG. 1, an engaging element 55 projects from an outer edge of the front cover 5 toward the side portion 32. Namely, the engaging element 55 is provided so as to project toward the side portion 32 from an outer edge portion of the front cover 5 adjacent to the side portion 32. The engaging element 55 is configured such that, when it is inserted into the hole 32a of the side portion 32, the front cover 5 engages with the front case 3, i.e., the main body section 2. Accordingly, the engaging element 55 is disposed in the vicinity of the lower portion 33 of the main body section 2 in conformity to the position of the hole 32a. Also, protrusions 52a and 52a project toward the main body section 2 from the rear surface of the upper face portion 52 of the front cover 5. The protrusions 52a and 52a are configured such that, when they are inserted into their corresponding holes 34 and 34 of the front case 3, the front cover 5 engages with the main body section 2. Further, a protrusion 53a projects toward the main body section 2 from the rear surface of the side face portion 53 of the front cover 5. The protrusion 53a is configured such that, when it is inserted into a hole 35 of the front case 3, the front cover 5 engages with the main body section 2.

In FIG. 1, the lens barrel cover 6, which is used for surrounding the periphery of the lens barrel 22 projecting from the main body section 2, is formed cylindrically. The tip face of the lens barrel cover 6 is formed with an opening 61 through which the lens barrel 22 can project forward. The opening 61 has a diameter slightly larger than the outer diameter of the lens barrel 22. It is important for the lens barrel 22 to be centered with respect to the opening 61 when the lens barrel cover 6 is attached to the main body section 2. Namely, since the lens barrel cover 6 and the front face portion of the lens barrel 22 are exposed to the exterior of the camera, the appearance of the camera will be spoiled when the lens barrel 22 is eccentrically positioned with respect to the opening 61. Therefore, it is necessary for the opening 61 and the lens barrel 22 to be placed with no positional deviation therebetween.

Figure 2B:
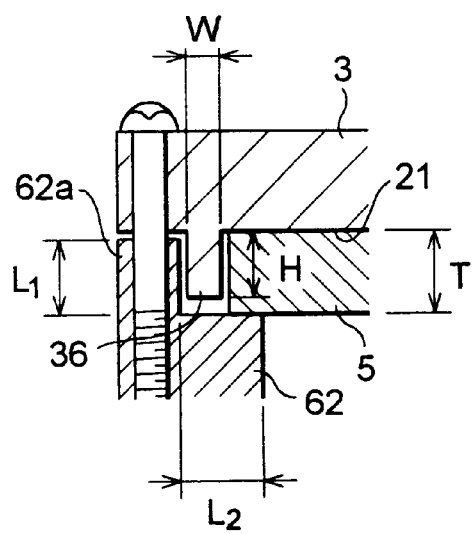
FIG. 2B is a partially enlarged view of FIG. 2A.

FIG. 2A is a view for explaining a structure for securing the front cover 5 in the camera 1. In FIG. 2A, the front cover 5 is attached to the front face 21 of the main body section 2, whereas the lens barrel 22 penetrates through the insertion opening 54 of the front cover 5. Also, the lens barrel cover 6 is disposed so as to surround the periphery of the lens barrel 22. The rear end 62 of the lens barrel cover 6 is secured to the main body section 2 (front case 3) while pressing the edge portion of the insertion opening 54 of the front cover 5 toward the main body section 2 (front case 3). For example, as shown in FIG. 2B, the rear end 62 of the lens barrel cover 6 has a step which is made by cutting an inner part of its outer peripheral surface, thus yielding a thin portion 62a at its end portion. As this thin portion 62a is disposed inside the rib 36, the lens barrel cover 6 is positioned with respect to the main body section 2. The lens barrel cover 6 can be fastened by a screw as shown in FIG. 2B.

It is important for this structure to be configured such that, as shown in FIG. 2B, the length $L_1$ of the thin portion 62a in the rear end 62 of the lens barrel cover 6 is smaller than the thickness T of the front cover 5 but greater than the projecting length H of the rib 36, while the cutting length $L_2$ for forming the thin portion 62a is greater than the width W of the rib 36. In this configuration, the lens barrel cover 6 can be positioned with respect to the main body section 2 by the rear end 62 of the lens barrel cover 6, while the front cover 5 can be secured to the main body section 2 as being pressed toward the main body section 2. In the lens barrel cover 6, the end face of the rear end 62 may press the front cover 5 so as to make it secured to the main body section 2, without providing the rear end 62 with a step and without forming the thin portion 62a.

In the following, a method of attaching the front cover 5 and the lens barrel cover 6 in the camera 1 will be explained.

First, in the state of FIG. 1, the front cover 5 is attached to the main body section 2. Namely, the engaging element 55 of the front cover 5 is inserted into the hole 32a of the main body section 2, and the front cover 5 is brought into close contact with the front face 21 of the main body section 2 while one side end of the front cover 5 is lightly pressed against the side edge of the side portion 32 of the main body section 2. Here, the rib 36 of the main body section 2 engages with the insertion opening 54, thus preventing the front cover 5 from moving on the front face 21. Also, as the front cover 5 is brought into close contact with the front face 21, the protrusion 53a of the side face portion 53 engages with the hole 35, and the protrusions 52a and 52a of the upper face portion 52 engage with their corresponding holes 34 and 34, whereby the front cover 5 is prevented from positionally shifting, and the upper part of the front cover 5 in the vicinity of the upper face portion 52 and its side part in the vicinity of the side face portion 53 are prevented from floating (forming a gap with respect to the main body section 2).

On the other hand, the side part of the front cover 5 adjacent to the main body section 2 and its lower part adjacent to the lower portion 33 of the main body section 2 are prevented from floating since the engaging element 55 engages with the hole 32a. The parts of the front cover 5 adjacent to the side portion 32 and lower portion 33, having no elements such as the upper face portion 52 and side face portion 53 that are bent toward the main body section 2, are likely to float from the front face 21 of the main body section 2. Since the engaging element 55 is disposed in the vicinity of the lower portion 33, however, the part of the front cover 5 adjacent to the side portion 32 is brought into close contact with the front face 21 of the main body section 2 when the engaging element 55 and the protrusions 52a and 52a engage with their corresponding holes, thus yielding no gap with respect to the main body section 2. Also, the part of the front cover 5 adjacent to the lower portion 33 is brought into close contact with the front face 21 of the main body section 2 when the engaging element 55 and the protrusion 53a engage with their corresponding holes, thereby yielding no gap with respect to the main body section 2.

Thus, by means of a simple structure in which the engaging element 55 is disposed in the vicinity of the lower portion 33 of the main body section 2, the front cover 5 can easily be attached to the main body section 2 while efficiently preventing the parts of the front cover 5 adjacent to the side portion 32 and the lower portion 33 from floating.

Next, the lens barrel cover 6 is attached. First, as shown in FIG. 1, the rear end 62 of the lens barrel cover 6 is directed toward the main body section 2 and is coupled with the main body section 2 such that the rear end 62 meets the rib 36 projecting from the main body section 2. Here, since the rear end 62 of the lens barrel cover 6 is configured so as to mate with the rib 36 as shown in FIG. 2B, the lens barrel cover 6 is securely guided to its appropriate coupling position, thereby facilitating the coupling operation. As the lens barrel cover 6 is coupled with the main body section 2, the rear end 62 of the lens barrel cover 6 abuts to the edge portion of the insertion hole 54 of the front cover 5. In this state, as the lens barrel cover 6 is fastened to the main body section 2 by a screw or the like, the front cover 5 is held between the main body section 2 and the lens barrel cover 6 so as to come into close contact with the front face 21 of the main body section 2. Namely, the parts of the front cover 5 surrounding the lens barrel 22, i.e., the parts of the front cover 5 adjacent to the side portion 32 and lower portion 33 completely come into close contact with the front face 21 of the main body section 2. Consequently, the front cover 5 is totally prevented from floating.

Thus, since the front cover 5 is brought into close contact with the main body section 2 while the lens barrel cover 6 is being attached, the front cover 5 can securely be prevented from floating from the main body section 2.

Also, in the foregoing securing structure, since the lens barrel cover 6 surrounding the periphery of the lens barrel 22 projecting from the main body section 2 is made separately from the front cover 5, the lens barrel cover 6 may be formed by resin molding or the like so as to attain accurate dimensions separately from the front cover 5. Consequently, the opening 61 can be disposed at an appropriate position with respect to the lens barrel 22 when the lens barrel cover 6 is attached to the main body section 2. Also, in this case, since the lens barrel cover 6 completely covers the edge portion of the insertion opening 54, the exterior of the camera 1 will not be affected at all even if the insertion opening 54 is not centered with respect to the lens barrel 22, whereby the appearance of the camera 1 will not be spoiled.

As explained in the foregoing, in the camera 1 in accordance with this embodiment, since the lens barrel cover 6 is made separately from the front cover 5, the center positions of the lens barrel 22 and opening 61 of the lens barrel cover 6 can easily be aligned with each other when the dimensional accuracy of the lens barrel cover 6 is enhanced separately from the front cover 5. Also, since the insertion opening 54 of the front cover 5 is disposed as being shielded with the lens barrel cover 6, the insertion opening 54 is not exposed to the exterior of the camera, whereby the appearance of the camera will not be spoiled even if the relative positions of the insertion opening 54 and lens barrel 22 deviate from each other. Also, since the front cover 5 is pressed toward the main body section 2 as the lens barrel cover 6 is being attached, no gap is formed between the front cover 6 and the main body section 2.

Embodiment 2

Figure 2C:
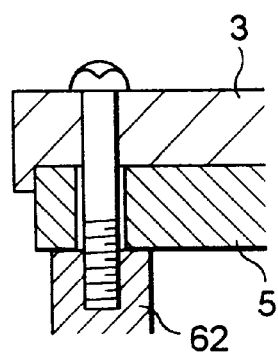
FIG. 2C is a partially enlarged view for explaining a structure for attaching a lens barrel cover in a camera in accordance with another embodiment of the present invention.
Figure 3:
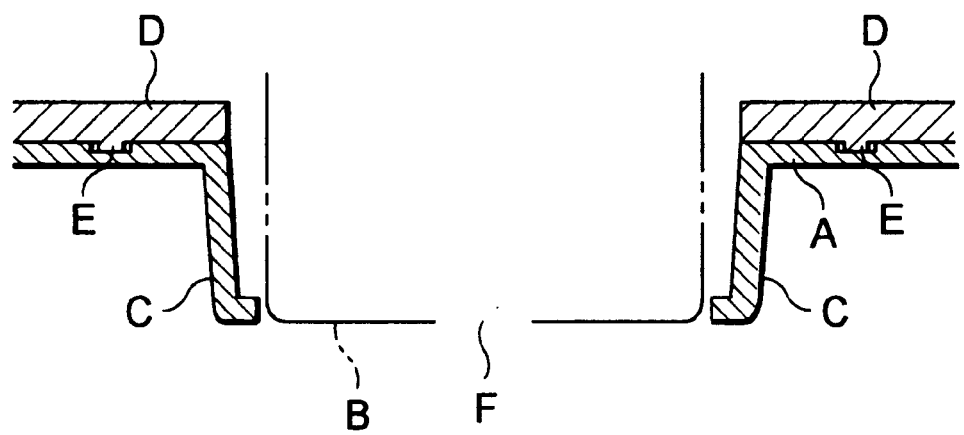
FIG. 3 is a schematic sectional view showing main parts of a conventional camera cover.

The lens barrel cover 6 is disposed in the camera 1 of Embodiment 1 such that the rear end 62 of the lens barrel cover 6 abuts onto the edge portion of the insertion opening 54 of the front face cover 5. However, it may be disposed such that the rear end 62 of the lens barrel cover abuts to a peripheral portion of the edge portion of the insertion opening 54 of the front cover 5 as shown in FIG. 2C. In this case, as with Embodiment 1, when the lens barrel cover 6 is made separately from the front cover 5, the center positions of the lens barrel 22 and opening 61 of the lens barrel cover 6 can easily be aligned with each other. Also, when the insertion opening 54 is disposed as being shielded with the lens barrel cover 6, the appearance of the camera would not be spoiled. Further, when the lens barrel cover 6 is attached as being screwed from the main body section 2 side so as to penetrate through the front cover 5, the front cover 5 is pressed toward the main body section 2, thus yielding no gap between the front cover 5 and the main body section 2.

Embodiment 3

Though the front cover 5 partially covers the front face 21 of the main body section 2 in the camera 1 of Embodiment 1, it may cover the whole surface of the front face 21 of the main body section 2. In this case, as with Embodiments 1 and 2, when the lens barrel cover 6 is made separately from the front cover 5, the center positions of the lens barrel 22 and opening 61 of the lens barrel cover 6 can easily be aligned with each other. Also, when the insertion opening 54 is disposed as being shielded with the lens barrel cover 6, the appearance of the camera would not be spoiled. Further, when the lens barrel cover 6 is attached as being screwed from the main body section 2 side so as to penetrate through the front cover 5, the front cover 5 is pressed toward the main body section 2, thus yielding no gap between the front cover 5 and the main body section 2.

Embodiment 4

Though the engaging element 55 of the front cover 5 in the securing structure for the front cover 5 in Embodiment 1 engages with the side portion 32 of the main body section 2, the engaging element 55 may project toward the lower portion 33 of the main body section 2. The operations and effects similar to those of the securing structure in the camera of Embodiment 1 are obtained in this case as well.

As explained in the foregoing, the following effects can be obtained in accordance with the present invention.

Since the lens barrel cover is made separately from the front cover, the center positions of the lens barrel and opening for projecting the lens barrel can easily be aligned with each other.

Also, since the lens barrel cover is disposed in a state where it covers the insertion opening of the front cover, the insertion opening of the front cover is not exposed to the exterior of the camera, whereby the appearance of the camera will not be spoiled even if the insertion opening and the lens barrel are positionally deviated from each other.

Further, since the front cover is pressed toward the main body section as the lens barrel cover is being attached, no gap is formed between the front cover and the main body section.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A structure for securing a front cover to a main body section of a camera having a lens barrel projecting from the main body section, the structure comprising:

a front cover adapted to cover a portion of a front face of the main body section and having an opening through which the lens barrel can pass; and a lens barrel cover formed separately from the front cover and adapted to cover an outer periphery of a portion of the lens barrel projecting through the opening in the front cover and adapted to be secured to the main body section while contacting the front cover.

2. The structure according to claim 1 wherein the front cover is shaped to expose a side and lower portion of the front face of the main body section to an exterior of the camera.

3. The structure according to claim 1 wherein the main body section comprises a front case and a rear case, and the lens barrel cover is secured to the front case by a screw.

4. The structure according to claim 3 wherein the screw passes through the front cover.

5. The structure according to claim 3 wherein the lens barrel cover is equipped with a portion for mating with a rib on the front case.

6. The structure according to claim 1 wherein the front cover has an engaging element adapted to engage with one of a side portion of the main body section and the front face of the main body section of the camera.

7. A camera comprising:

a main body section;

a lens barrel projecting from the main body section;

a front cover covering a portion of a front face of the main body section and having an opening through which the lens barrel can pass; and a lens barrel cover formed separately from the front cover and covering an outer periphery of a portion of the lens barrel projecting through the opening in the front cover and being secured to the main body section while contacting the front cover.

8. The camera according to claim 7 wherein the lens barrel cover contacts the front cover adjoining the opening.

9. The camera according to claim 7 wherein the front cover exposes a side and lower portion of the front face of the main body section to an exterior of the camera.

10. The structure according to claim 7 wherein the main body section comprises a front case and a rear case, and the lens barrel cover is secured to the front case by a screw.

11. The structure according to claim 10 wherein the screw passes through the front cover.

12. The camera according to claim 10 wherein the front case is provided with a rib mating with the lens barrel cover.

13. The structure according to claim 7 wherein the front cover has an engaging element engaging with one of a side portion of the main body section and the front face of the main body section of the camera.

* * * * *